(12) United States Patent
Lagorce (10) Patent No.: US 11,995,878 B2
(45) Date of Patent: May 28, 2024

(54) METHOD OF PROCESSING INFORMATION FROM AN EVENT-BASED SENSOR

(71) Applicant: PROPHESEE, Paris (FR)

(72) Inventor: Xavier Lagorce, Saint Maur des Fosses (FR)

(73) Assignee: PROPHESEE, Paris (FR)

( * ) Notice: Subject to any disclaimer, the term of this patent is extended or adjusted under 35 U.S.C. 154(b) by 187 days.

(21) Appl. No.: 17/427,033

(22) PCT Filed: Jan. 29, 2020

(86) PCT No.: PCT/EP2020/052200
§ 371 (c)(1),
(2) Date: Jul. 29, 2021

(87) PCT Pub. No.: WO2020/157157
PCT Pub. Date: Aug. 6, 2020

(65) Prior Publication Data
US 2022/0101640 A1  Mar. 31, 2022

(30) Foreign Application Priority Data
Jan. 30, 2019 (EP) ...................................... 19154401

(51) Int. Cl.
*G06V 20/40* (2022.01)
*G06F 16/583* (2019.01)
(Continued)

(52) U.S. Cl.
CPC .......... *G06V 10/267* (2022.01); *G06F 16/583* (2019.01); *G06T 7/269* (2017.01);
(Continued)

(58) Field of Classification Search
CPC .. G06T 7/246; G06T 7/20; G06T 7/73; G06T 7/269; G06T 7/50; H04N 25/707;
(Continued)

(56) References Cited

U.S. PATENT DOCUMENTS

| 2008/0135731 A1* | 6/2008 | Lichtsteiner | ........... H04N 25/76 |
| | | | 348/E3.018 |
| 2013/0335595 A1* | 12/2013 | Lee | ........................ H04N 23/80 |
| | | | 348/231.5 |

(Continued)

FOREIGN PATENT DOCUMENTS

| WO | 2013/093378 A1 | 6/2013 | |
| WO | WO-2013093378 A1 * | 6/2013 | ......... G06K 9/00771 |

(Continued)

OTHER PUBLICATIONS

Lichtsteiner et al., "A 128x128 120dB 15us Latency Asynchronous Temporal Contrast Vision Sensor," *IEEE Journal of Solid-State Circuits*, Mar. 2008, 25 pages.

(Continued)

*Primary Examiner* — Ian L Lemieux
*Assistant Examiner* — Woo C Rhim (57) ABSTRACT

An event-based sensor has an array of pixels facing a scene. The information to be processed includes events originating from the pixels depending on variations of incident light from the scene. A method includes storing a data structure for a set of pixels of the array, the data structure including, for each pixel of the set, event data associated with a most recent event originating from the pixel. Upon receiving a current event from a first pixel of the array, the method includes retrieving any event data included in the data structure for a group of pixels including the first pixel and a plurality of second pixels adjacent to the first pixel in the array. The current event is labelled based on at least one connectivity criterion between the current event and the most recent event originating from a pixel of the group.

12 Claims, 4 Drawing Sheets

(51) Int. Cl.
| | |
|---|---|
| *G06T 7/269* | (2017.01) |
| *G06T 7/50* | (2017.01) |
| *G06V 10/20* | (2022.01) |
| *G06V 10/26* | (2022.01) |
| *G06V 10/762* | (2022.01) |
| *G06V 20/70* | (2022.01) |

(52) U.S. Cl.
CPC ............... *G06T 7/50* (2017.01); *G06V 10/20* (2022.01); *G06V 10/762* (2022.01); *G06V 20/70* (2022.01); *G06V 20/44* (2022.01)

(58) Field of Classification Search
CPC ...... G06V 20/44; G06V 10/267; G06V 10/20; G06V 10/762; G06V 20/70; G06F 16/583
See application file for complete search history.

(56) References Cited

U.S. PATENT DOCUMENTS

| | | | | |
|---|---|---|---|---|
| 2015/0030204 | A1* | 1/2015 | Lee | G06T 7/246 382/103 |
| 2016/0086334 | A1* | 3/2016 | Fan | G06F 16/583 382/190 |
| 2016/0109955 | A1* | 4/2016 | Park | G09G 5/00 345/668 |
| 2016/0203614 | A1* | 7/2016 | Wang | G06V 10/147 382/103 |
| 2017/0053407 | A1* | 2/2017 | Benosman | G06T 7/246 |
| 2018/0063449 | A1* | 3/2018 | Sio-Hoi | G06V 40/166 |
| 2018/0191972 | A1* | 7/2018 | Berner | G06F 11/004 |
| 2018/0262705 | A1* | 9/2018 | Park | G06F 16/2322 |
| 2018/0308253 | A1* | 10/2018 | Ryu | G06T 7/38 |
| 2019/0096068 | A1* | 3/2019 | Fontanel | G06T 7/20 |
| 2020/0092507 | A1* | 3/2020 | Park | H04N 25/772 |
| 2020/0111220 | A1* | 4/2020 | Delbruck | G06T 7/223 |
| 2020/0273180 | A1* | 8/2020 | Kaufmann | G06T 7/292 |
| 2020/0412930 | A1* | 12/2020 | Jung | H04N 25/50 |
| 2021/0044744 | A1* | 2/2021 | Sironi | H04N 25/47 |
| 2021/0279890 | A1* | 9/2021 | Mou | G06V 20/40 |
| 2022/0046191 | A1* | 2/2022 | Movshovich | H04N 25/46 |

FOREIGN PATENT DOCUMENTS

| | | | | |
|---|---|---|---|---|
| WO | 2016/146938 | A1 | 9/2016 | |
| WO | WO-2016146938 | A1 * | 9/2016 | ............. G06T 7/593 |

OTHER PUBLICATIONS

Posch et al., "Retinomorphic Event-Based Vision Sensors: Bioinspired Cameras With Spiking Output," *Proceedings of the IEEE* 102(10):1470-1484, 2014.

Posch et al., "A QVGA 143 dB Dynamic Range Frame-Free PWM Image Sensor With Lossless Pixel-Level Video Compression and Time-Domain CDS," *IEEE Journal of Solid-State Circuits* 46(1):259-274, Jan. 2011.

Delbruck, "Frame-free dynamic digital vision," Proceedings of Intl. Symp. on Secure-Life Electronics, Advanced Electronics for Quality Life and Society, University of Tokyo, Mar. 6-7, 2008, pp. 21-26.

Drazen et al., "Toward real-time particle tracking using an event-based dynamic vision sensor," *Exp Fluids* 51, 2011, pp. 1465-1469.

Litzenberger et al., "Embedded Vision System for Real-Time Object Tracking Using an Asynchronous Transient Vision Sensor," 2006, IEEE 12th Digital Signal Processing Workshop & 4th IEEE Signal Processing Education Workshop, Sep. 27, 2006, pp. 173-178.

* cited by examiner

|  | $(y_i, y_i-1)$ |  |
|---|---|---|
| $(x_i-1, y_i)$ | A, E $(x_i, y_i)$ | $(x_i+1, y_i)$ — ev(i+1, t$_i$) |
|  | $(x_i, y_i+1)$ |  | ev(i+2, t$_i$)

FIG. 3a

| $(x_i-1, y_i-1)$ | $(x_i, y_i-1)$ | $(x_i+1, y_i-1)$ |
|---|---|---|
| $(x_i-1, y_i)$ | A, E $(x_i, y_i)$ | $(x_i+1, y_i)$ — ev(i+1, t$_i$) |
| $(x_i-1, y_i+1)$ | $(x_i, y_i+1)$ | $(x_i+1, y_i+1)$ | ev(i+2, t$_i$)

METHOD OF PROCESSING INFORMATION FROM AN EVENT-BASED SENSOR

The present invention relates to machine vision, especially to a method of processing information from an event-based sensor.

BACKGROUND

Machine vision is a field that includes methods for acquiring, processing, analyzing and understanding images for use in wide type of applications such as for example security applications (e.g., surveillance, intrusion detection, object detection, facial recognition, etc.), environmental-use applications (e.g., lighting control), object detection and tracking applications, automatic inspection, process control, and robot guidance etc. Therefore, machine vision can be integrated with many different systems.

In order to achieve these applications, especially object detection and tracking, it is necessary to extract and segment concerned objects in the image or scene in the machine vision.

In the art, many standard computer vision algorithms have been developed for the above mentioned detection and tracking, such as object tracking, simultaneous localization and mapping (SLAM) and visual flow. However, those algorithms are based on features which are interesting parts of an image or a scene, such as edges, interest points, blobs and ridges. These features must be detected and extracted before being further processed by the computer vision algorithms.

Many feature extractors have been developed, which vary in the kinds of feature detected, the computational complexity and the repeatability. Among these, connected component labeling (CCL), which is an algorithmic application of graph theory, is widely used to label and cluster relevant points based on their connectivity.

As the CCL algorithm traverses a whole image at least once or multiple times, such as for seed-filing and two-pass algorithms, it is mainly used on frame-based image sensors which acquire the visual information from the scene either sequentially for each sensor element (pixel) or each pixel line/column or, in various patterns, pixel parallel, but always time-sampled at some limited and most of time fixed frame rate.

However, the framed-based image sensors have limits in many applications. They capture and transmit a fixed number of frames, and so the data outputted by the framed-based image sensors have problems rendering fast motion, including occlusions/disocclusions of objects between consecutive frames. This causes difficulties for feature extraction and tracking. In addition, due to the nature of the framed-based image sensors, they also have a limited dynamic resolution, which complicates tracking of complicated and/or fast moving objects. Tracking such objects with a framed-based image sensor requires either a very high frame rate, which results in a very computationally intensive implementation due to the many frames to be processed, or very complicated tracking algorithms, which is also very computationally intensive by nature. Moreover, framed-based image sensors also generate lots of unnecessary overhead, such as redundant frames in the absence of change in the scene, leading to an unnecessary usage of computational power.

Event-based sensors have been developed, so as to overcome limitations of the framed-based image sensor. Instead of capturing an image with all the pixels at the same time and trying to compensate for the artifacts and suppress information, an event-based image sensor acquires the temporal luminance profile sensed by each pixel from the scene viewed by the sensor. Event-based sensors can capture fast changing information in a visual scene due to the high temporal resolution of the information individually acquired by the pixels. More details of such an event-based machine vision technology is discussed in the article Posch, C., Serrano-Gotarredona, T., Linares-Barranco, B., & Delbruck, T. (2014), "Retinomorphic event-based vision sensors: bio-inspired cameras with spiking output", Proceedings of the IEEE, 102(10), 1470-1484.

Indeed, the data outputted by the event-based sensor enable the computer vison algorithm to work in high dynamic range (HDR) conditions and be more robust to lighting conditions.

However, the existing CCL algorithms are not suitable to be applied to the output data of the event-based sensor.

In order to extract features, which will be used in computer vision algorithms, for the event-based data, few solutions has been developed so far.

A new approach is needed for processing event-based data so as to cluster different events and perform classification for use in computer vision algorithms.

SUMMARY

A method of processing event-based data from an event-based sensor is proposed. The event-based has an array of pixels facing a scene, and the information to be processed includes events originating from the pixels depending on variations of incident light from the scene. The method comprises:

storing a data structure for a set of pixels of the array, the data structure including, for each pixel of the set, event data associated with at least one most recent event originating from said pixel; and upon receiving a current event from a first pixel of the array:
  retrieving any event data included in the data structure for a group of pixels including the first pixel and a plurality of second pixels adjacent to the first pixel in the array; and
  labeling the current event based on at least one connectivity criterion between the current event and the most recent event originating from a pixel of said group.

If the current event does not fulfil the at least one connectivity criterion with any event being a most recent event originating from a pixel of the group, labeling the current event may comprise:
  allocating a new cluster ID to the current event; and
  including the allocated new cluster ID in the event data included in the data structure for the first pixel.

If the current event fulfils the at least one connectivity criterion with only one event being a most recent event originating from a pixel of the group, labeling the current event may comprise:
  allocating to the current event a cluster ID previously allocated to said one event; and
  including the allocated cluster ID in the event data included in the data structure for the first pixel.

If the current event fulfils the at least one connectivity criterion with a plurality of events that are most recent events originating from respective pixels of the group while a same cluster ID is allocated to said plurality of events, labeling the current event may comprise:
  allocating the same cluster ID to the current event; and including the same allocated cluster ID in the event included in the data structure for the first pixel.

If the current event fulfils the at least one connectivity criterion with a plurality of events that are most recent events originating from respective pixels of the group while different cluster IDs are allocated to said plurality of events, labeling the current event may comprise:

merging the different cluster IDs into a merged cluster ID;

allocating the merged cluster ID to the current event; and including the allocated merged cluster ID in the event data included in the data structure for the first pixel.

In an embodiment, the plurality of second pixels include 4 or 8 pixels directly surrounding the first pixel in the array of pixels. For example, in case of 4 pixels, those 4 pixels may be the second pixels located immediately left, right, above and below the first pixel. In addition, the plurality of second pixels may also include pixels at neighbors with larger radius, for example 8 direct neighbor pixels and another 16 pixels next to the 8 director neighbor pixels, etc.

There are different possibilities, which may be combined together, all or in part, regarding the contents of the event data associated with events recently originated from the set of pixels, such as those listed below.

One possibility consists in that the event data included in the data structure for a pixel include a timestamp of the most recent event originating from said pixel. In such an embodiment, the at least one connectivity criterion between the current event and a most recent event originating from a pixel of said group may include a criterion applied to a difference of timestamps between the current event and the most recent event originating from said pixel of the group.

Another possibility consists in that the event data included in the data structure for a pixel include a polarity of a most recent event originating from said pixel. In such an embodiment, the at least one connectivity criterion between the current event and a most recent event originating from a pixel of said group may include a criterion applied to respective polarities of the current event and of a most recent event originating from said pixel of the group.

Another possibility consists in that the event data included in the data structure for a pixel include a flickering frequency estimated for a most recent event originating from said pixel. In such an embodiment, the at least one connectivity criterion between the current event and a most recent event originating from a pixel of said group may include a criterion applied to respective flickering frequencies estimated for the current event and for a most recent event originating from said pixel of the group.

Another possibility consists in that the event data included in the data structure for a pixel include visual flow data estimated for a most recent event originating from said pixel. In such an embodiment, the at least one connectivity criterion between the current event and a most recent event originating from a pixel of said group may include a criterion applied to respective visual flow data estimated for the current event and for a most recent event originating from said pixel of the group.

Yet another possibility consists in that the event data included in the data structure for a pixel include a depth or stereo disparity value estimated for a most recent event originating from said pixel. In such an embodiment, the at least one connectivity criterion between the current event and a most recent event originating from a pixel of said group may include a criterion applied to respective depth or stereo disparity values estimated for the current event and for a most recent event originating from said pixel of the group.

Yet another possibility consists in that the event data included in the data structure for a pixel include a luminance value of the most recent event originating from said pixel. In such an embodiment, at least one connectivity criterion between the current event and a most recent event originating from a pixel of said group includes a criterion applied to a difference of the luminance between the current event and the most recent event originating from said pixel of the group.

Yet another possibility consists in that the event data included in the data structure for a pixel include a semantic ID which indicates a type of an object in the scene of the most recent event originating from said pixel. The semantic ID is generated by other algorithm on the basis of the type of the object the event belongs to, such as car, pedestrian, road, tree, building, marking, traffic sign, etc. In such an embodiment, at least one connectivity criterion between the current event and the most recent event originating from a pixel of said group includes a criterion applied to respective semantic IDs of the current event (E) and the most recent event originating from said pixel of the group.

In an embodiment, the method further comprises grouping events labelled with a same cluster ID so as to from a cluster, and extracting features from the cluster. The extracted features may comprise, for example, edges, interest points, regions of interest points, or ridges. The cluster may be tracked based on the extracted features by means of an estimator which estimates a position of a center of the cluster and a speed of the cluster.

Another aspect of the present invention relates to a computer program comprising program code to be executed by a processor coupled with an event-based sensor. The program code is adapted to performance of a method as defined above when executed by the processor.

BRIEF DESCRIPTION OF THE DRAWINGS

Other features and advantages of the present invention will appear in the description hereinafter, in reference to the appended drawings, where.

DESCRIPTION OF EMBODIMENTS

Figure 1:
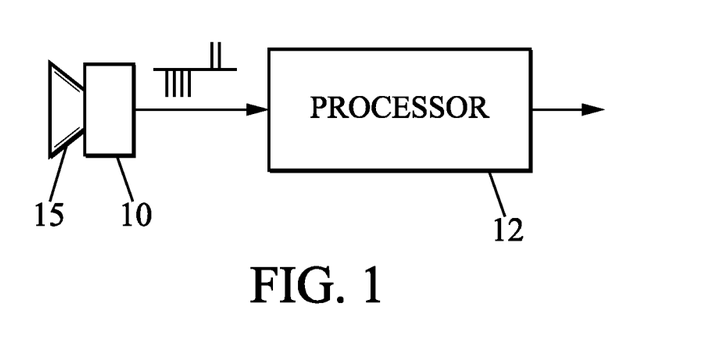
FIG. 1 is a block diagram of a device adapted to implementation of the invention.

The apparatus shown in FIG. 1 comprises an event-based asynchronous vision sensor 10 placed facing a scene and receiving the light flow of the scene through optics for acquisition 15 comprising one or several lenses. The sensor 10 is placed in the image plane of the optics for acquisition 15. It comprises an array of sensing elements, such as photosensitive elements, organized into a matrix of pixels. Each sensing element corresponding to a pixel produces successive events depending on variations of light in the scene.

A processor 12 processes the information originating from the sensor 10, i.e. the sequences of events received, for example asynchronously, from the various pixels. It can be implemented by programming using a suitable programming language. A hardware implementation of the processor 12 using specialized logic circuits (ASIC, FPGA, . . . ) or chip coupled with the sensor 10 is also possible.

Furthermore, the processor 12 shown in FIG. 1 is embodied separately from the event-based sensor 10. Alternative architectures are possible. In particular, part or all of the processing illustrated in FIG. 2 can be performed in the same component as the event-based sensor 10, in an on-chip architecture. It is also possible to split the tasks between more than one processors operating sequentially or in parallel.

For each sensing element, i.e. pixel, the sensor 10 generates an event-based signal sequence depending on the variations of light received by the pixel from the scene that appears in the field of vision of the sensor.

The asynchronous sensor 10 carries out an acquisition to output a signal which, for each pixel, may be in the form of a succession of instants $t_k$ (k=0, 1, 2, . . . ) at which an activation threshold Q is reached. Each time this luminance increases by a quantity equal to the activation threshold Q starting from what it was in time $t_k$, a new instant $t_{k+1}$ is identified and a spike is emitted at this instant $t_{k+1}$. Symmetrically, each time that the luminance observed by the pixel decreases by the quantity Q starting from what it was in time $t_k$, a new instant $t_{k+1}$ is identified and a spike is emitted at this instant $t_{k+1}$. The signal sequence for the pixel includes a succession of spikes positioned over time at instants $t_k$ depending on the light profile for the pixel. Without limitation, the output of the sensor 10 is then in the form of an address-event representation (AER). In addition, the signal sequence typically includes a luminance attribute corresponding to a variation of incident light.

The activation threshold Q can be fixed, or can be adapted as a function of the luminance. For example, the threshold can be compared to the variations in the logarithm of the luminance for generating events when exceeded.

By way of example, the sensor 10 can be a dynamic vision sensor (DVS) of the type described in "A 128×128 120 dB 15 µs Latency Asynchronous Temporal Contrast Vision Sensor", P. Lichtsteiner, et al., IEEE Journal of Solid-State Circuits, Vol. 43, No. 2, February 2008, pp. 566-576, or in patent application US 2008/0135731 A1. The dynamics of a retina (minimum duration between the action potentials) can be approached with a DVS of this type. The dynamic behavior surpasses that of a conventional video camera that has a realistic sampling frequency. When a DVS is used as the event-based sensor 10, data pertaining to an event originating from a pixel include the address of the pixel, a time of occurrence of the event and a luminance attribute corresponding to a polarity of the event, e.g. +1 if the luminance increases and −1 if the luminance decreases.

Another example of an asynchronous sensor 10 that can be used advantageously in the context of this invention is the asynchronous time-based image sensor (ATIS) of which a description is given in the article "A QVGA 143 dB Dynamic Range Frame-Free PWM Image Sensor With Lossless Pixel-Level Video Compression and Time-Domain CDS", C. Posch, et al., IEEE Journal of Solid-State Circuits, Vol. 46, No. 1, January 2011, pp. 259-275. When an ATIS is used as the event-based sensor 10, data pertaining to an event originating from a pixel include the address of the pixel, a time of occurrence of the event and a luminance attribute corresponding to an estimated value of the absolute luminance.

The event-based data generated by the event-based asynchronous vision sensor 10 can be used for many applications, among which extracting features from the objects in the scene and using these extracted features in many standard computer vision algorithms, such as object tracking, SLAM and visual flow.

Usually, these standard computer vision algorithms are based on features, such as salient points/interest points, edges, regions of interest points and ridges, which are interesting part of the object in the image of an object in the scene directly obtained from frame-based sensor or synthesized from event-based data. Therefore, the feature extraction is a starting point and main primitive for subsequent computer vision algorithms.

As mentioned, the features are detected and extracted from a frame-based sensor, such as a camera, where every pixel in the frame-based sensor will be scanned and examined to see if a feature is present. When the frame-based sensor contains too many pixels such as for high-resolution image, or when the image is in HDR condition, the data steam generated by the frame-based sensor requires high performance downstream components including memory and processors so as to handle overflow situation, which is especially a problem for high resolution and dynamic images.

On the contrary, extracting features coming from the events generated by an event-based sensor can avoid this problem with much higher temporal resolution, enabling the higher-level optimization process to start from a closer previous optimal solution which could enable faster convergence of the optimization process and higher throughput.

However, even though feature extraction, especially by CCL, is widely used with frame-based sensors, feature extraction from event-based data is still a problem in the art.

Few methods used on the event-based data have been proposed, and it is more difficult to use normal methods, such as CCL, on the event-based data. These methods are directly based on frames or images obtained by a frame-based sensor, which scan all the pixels in the image at least once to find connectivity. However, since the event-based sensor does not generate the whole image in its raw output data, i.e. event-based data, these methods can no longer be applied, unless an image is generated from the events, which reduces the advantages of using the event-based senor.

Contrary to frame-based CCL, which need scan the image at least once to label connected components and then merge cluster and extract features, a method proposed herein intends to group events following a connectivity criterion in an online manner, without passing over the data to merge clusters after finding a connection between the clusters, such as the one used in CCL.

Figure 2:
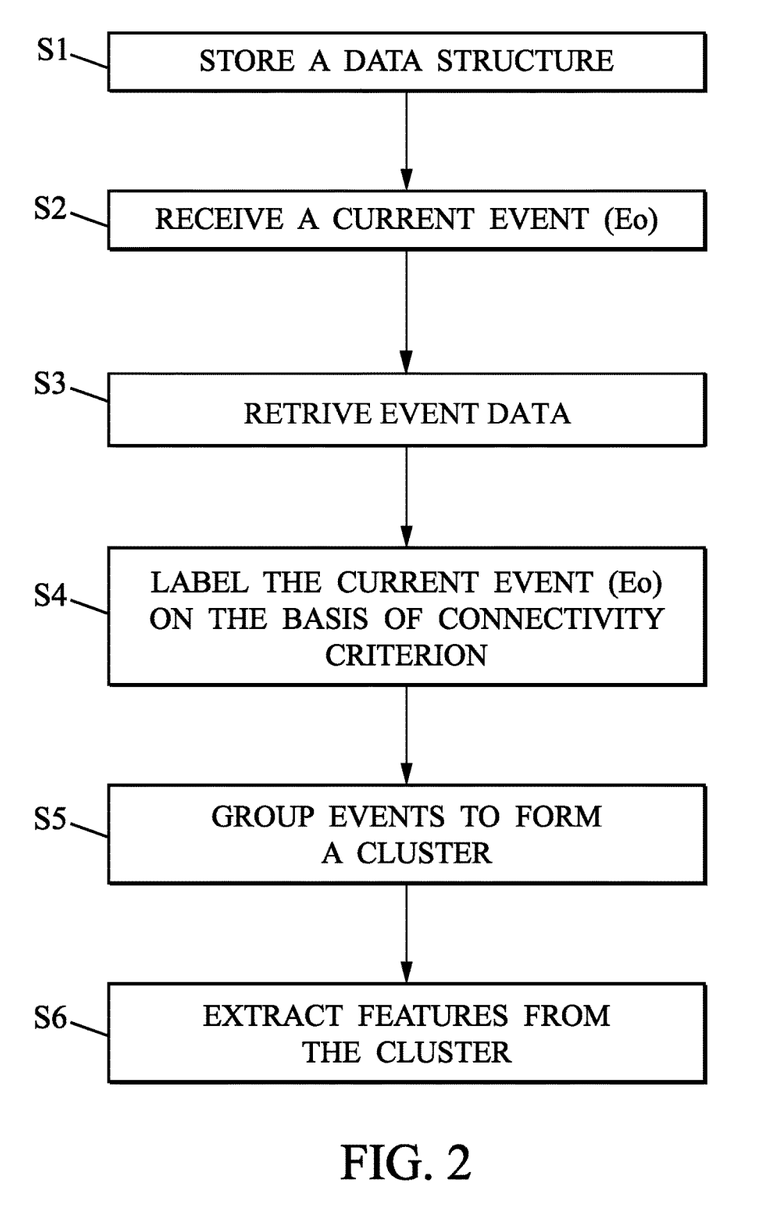
FIG. 2 is a flowchart of an illustrative method according to the invention.

In an example, FIG. 2 shows a flowchart of a method of processing event-based data generated from the event-based sensor 10, as mentioned above.

As shown in FIG. 2, in step S1, after events are generated by the pixels in the array of the event-based sensor 10, in response to variations of incident light from the scene facing the sensor, a data structure for a set of pixels of the array is established and stored. The data structure includes, for each pixel of the set, event data associated with at least one most recent event originating from the pixel.

By way of example, the aforesaid set of pixels can be made of the pixels of the array that have generated one or more events in a sliding window having a duration T and ending at the current instant. Thus, the set does not include pixels in regions of the array that are currently inactive. The parameter T can be fixed (e.g. T=10 milliseconds as an illustration) or adaptive, locally or globally, as a function of the events generated by the array. The parameter T can be different for different regions of the pixel array, so as to be variable as a function of the incoming light sensed by the pixels across the array. Alternatively, the 'set of pixels' can include all the pixels of the sensor array, i.e. T=∞.

The data structure is a dynamic one. It is initially stored in step S1 for starting the process, and subsequently updated in the following steps which are carried out as events are received from the event-based sensor.

The data structure may contain one or more of the following items forming the event data for a pixel having an address expressed as an index i, and coordinates $(x_i, y_i)$ in the array:

timestamp $t_i$ of the most recent event $ev(i, t_i)$ received from the address i in the array. Whenever a new event is received at a time $t_i$ from pixel i, the new timestamp $t_i$ replaces the one previously stored in the data structure for pixel i;

luminance value $L_i$ associated with the pixel at address i. In the case of an ATIS-type of sensor, or the like, the luminance value $L_i$ is available with the event $ev(i, t_i)$ in the signal flow coming from the sensor;

polarity $p_i$ of the most recent event $ev(i, t_i)$ originating from the pixel at address i. The polarity $p_i$ is generally available with the event $ev(i, t_i)$ in the signal flow coming from the sensor;

flickering frequency estimated for the most recent event $ev(i, t_i)$ originating from the pixel at address i. Such frequency information can be estimated, for example, using a method as disclosed in the European patent application No. 18305063.2;

visual flow data estimated at position $(x_i, y_i)$ for the most recent event $ev(i, t_i)$ originating from the pixel at address i. Such visual flow data can be estimated, for example, using a method as disclosed in WO 2013/093378 A1;

depth value estimated for the most recent event $ev(i, t_i)$ originating from the pixel at address i. The depth value may also be expressed as a stereo disparity value. It can be obtained from the signal flows from two or more event-based sensors viewing the scene from different angles. Such depth or stereo disparity value can be estimated, for example, using a method as disclosed in WO 2016/146938 A1;

a cluster ID associated with a cluster of events to which the most recent event $ev(i, t_i)$ originating from the pixel at address i is considered to belong, in accordance with the steps S4-S5 described further below;

the above-mentioned parameter T representing the duration of the time window over which comparisons are to be performed when an event $ev(i, t_i)$ is received from the pixel at address i, if that parameter T is allowed to vary from one pixel of the array to another.

It will be appreciated that other kind of information can be included in the data structure, depending on functionality provided by the event-based sensor itself and/or of processing performed on the event-based signal flow. The content of the data structure may also be adapted depending on the application to which the present method provides classification data.

It will also be appreciated that, in a practical implementation, the data structure, stored and maintained as events are received, can have the information (i.e. part or all of the items listed above) for all the pixels of the array, not only for those of the above-mentioned set of pixels. In such an implementation, a pixel at an address j in the array, whose most recent event has a timestamp $t_j$ earlier than $t_i-T$ (i.e. a pixel that does not belong to the "set" at time $t_i$), will be disregarded in the processing performed upon receipt of an event at time $t_i$.

While the above list of possible items, that may be part of the event data included in the dynamic data structure for a given pixel i, only refers to the most recent event received from that pixel i, it is also possible to include event data associated with more than one event most recently received from that pixel i. For example, timestamps and event polarities can be stored as part of the event data for the N most recent events received from pixel i, where N is a predefined integer or for any events received during the time window T (or some shorter window). Other event data, such as luminance, flickering frequency, depth or stereo disparity value, cluster ID, etc. can be determined in a combined way for the most recent event or events taken into account in the data structure.

The information stored in the data structure, together with event attributes included in or derived from receipt of an incoming current event, is used to evaluate connectivity criteria for deciding dynamically whether the current event should be considered as connected to one or more other previous events generated recently in a spatial neighborhood of the current event.

The method proposed herein makes it possible to make such decisions on connectivity immediately as events are received, if desired.

In step S2, a current event E from a first pixel A of the array, whose connectivity with other events is going to be checked in steps 3 and 4, is received.

In the following step S3, event data included in the data structure from a group of pixels is retrieved, and in step S4, the current event E is labelled with a cluster ID based on a connectivity criterion or a combination of more several connectivity criteria.

Here, the "group of pixels" refers to a spatial neighborhood of the current event. In other words, it is made of the first pixel A and a plurality of second pixels in the neighborhood of the first pixel in the array. In an example illustrated in FIG. 3(a), the group of pixels around pixel A at position $(x_i, y_i)$ consists of four second pixels at positions $(x_i+1, y_i)$, $(x_i-1, y_i)$, $(x_i, y_i+1)$, $(x_i, y_i-1)$. Alternatively, there can be eight second pixels at positions $(x_i+1, y_i)$, $(x_i-1, y_i)$, $(x_i, y_i+1)$, $(x_i, y_i-1)$, $(x_i+1, y_i+1)$, $(x_i-1, y_i+1)$, $(x_i+1, y_i-1)$, $(x_i-1, y_i-1)$ in the group, as shown in FIG. 3(b). Yet another possibility is to include neighbors in larger radius as mentioned before or another layer of second neighbors in the group of pixels, or more layers.

It is possible that, when the current event E originating from the first pixel A at position $(x_i, y_i)$ is received at time t, there is no event data relating to the relevant group of neighbor pixel in the data structure (or all the neighbor pixels of the group have a timestamp earlier than t−T). If so, at step S4, the current event E is labeled with a new cluster ID, which is detailed in FIG. 4. In step S41, the current event E is checked to see if it meets at least one connectivity criterion with any event that is a most recent event originating from a pixel of the group. When no connectivity criterion is met, i.e. the current event E does not connect to any event of the data structure, a new cluster ID is allocated to the current event E and the allocated new cluster ID is included in the event data relating to pixel A and associated with the current event in step S42.

Otherwise, the current event is checked to see if it fulfils one or more connectivity criterion with any event being a most recent event originating from a pixel of the group. For example, a further step S43 of checking if the current event fulfils a connectivity criterion with only one most recent event from a pixel of the group is conducted. When the current event E fulfils a connectivity criterion with only one event, for example a most recent event ev(i+1, $t_i$) originating from a neighbor pixel at position ($x_i$+1, $y_i$) in FIG. 3a or 3b, the current event E is labeled in step S44 with a cluster ID previously allocated to the event ev(i+1, $t_i$).

If, in step S43, the current event E is found to fulfil one or more connectivity criterion with a plurality of most recent events respectively originating from respective pixels in the data structure, the cluster IDs of the plurality of events is checked in step S45 to see if they share the same cluster ID. This occurs if, for example, in addition to connecting to event ev(i+1, $t_i$), the current event E connects to another event ev(i+2, $t_i$) originating from additional neighbor pixel at position ($x_i$, $y_i$+1).

If, in step S45, the cluster IDs previously allocated to the plurality events are the same, e.g. events ev(i+1, $t_i$) and ev(i+2, $t_i$) share one same cluster ID, the current event E is allocated with this the same cluster ID which is then included in the event data relating to pixel A in step S46.

If, in step S45, the cluster IDs previously allocated to the plurality of events are different, e.g. events ev(i+1, $t_i$) and ev(i+2, $t_i$) have different IDs, the different IDs are, in step S47, merged into a new cluster ID, which, for example, can be one of the IDs of ev(i+1, $t_i$) and ev(i+2, $t_i$) or another ID according to a pre-set rule, such as the smallest or biggest one or the one getting the most events in the past. Such an ID merge can, for example, be notified to another application so that one knows that the IDs, which were received previously correspond to the same cluster, are now expressed by the merged cluster ID.

In this case, the current event E is then labelled, in step S48, by being allocated with the merged cluster ID which is included in the event data associated with the current event. In addition, an equivalence table can also be used so as to not rewrite the whole data structure for replacing the merged IDs in data structure when associating an event with a merged cluster ID.

Figure 3A:
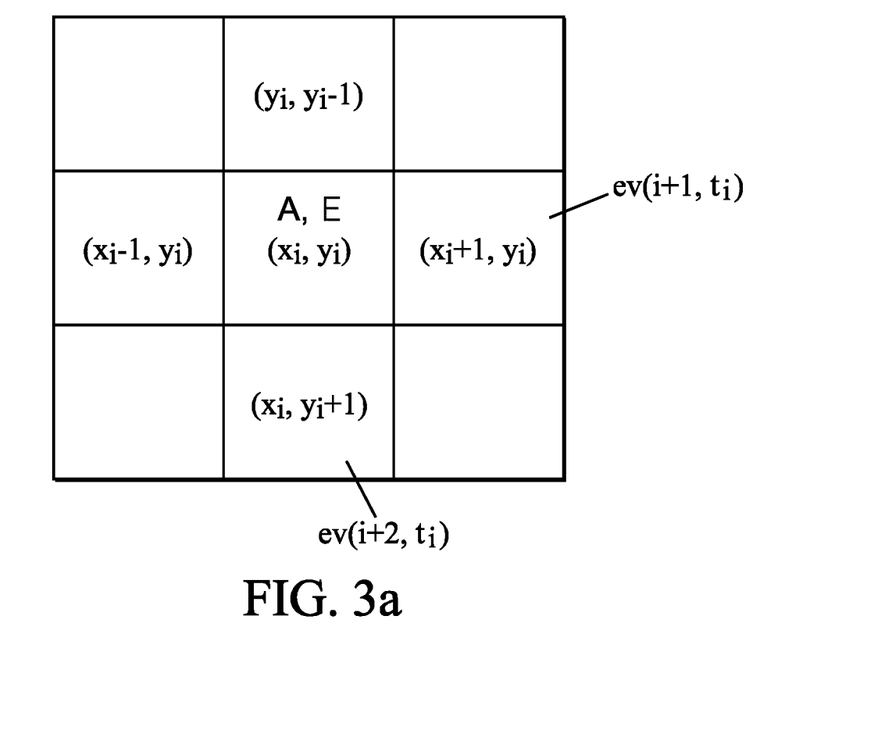
FIGS. 3a and 3b show patterns of a group of pixels containing a first pixel and four or eight second pixels surrounding the first pixel.
Figure 3B:
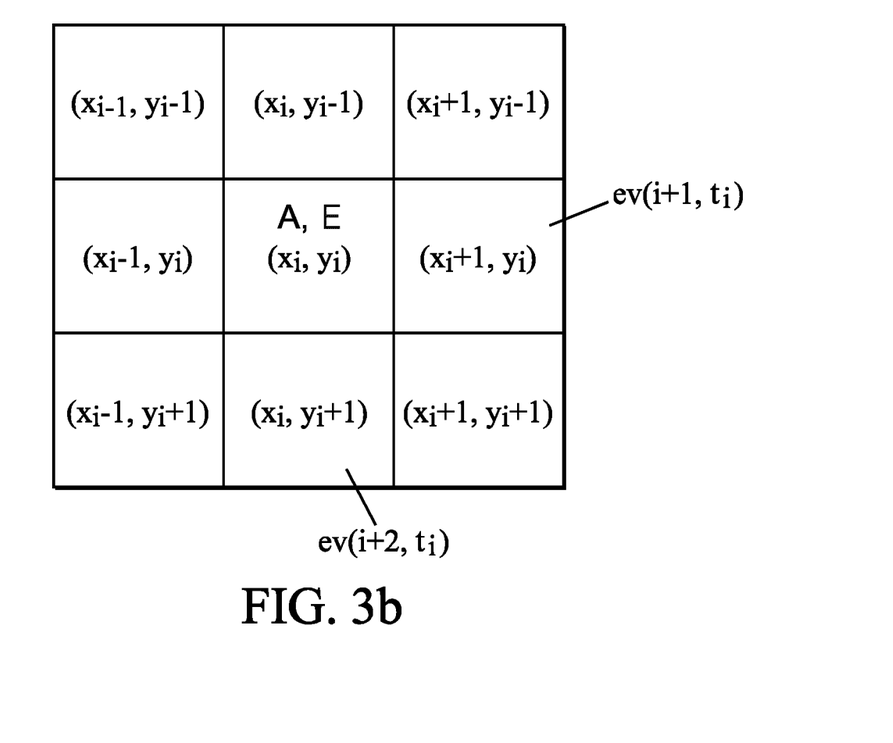
Figure 4:
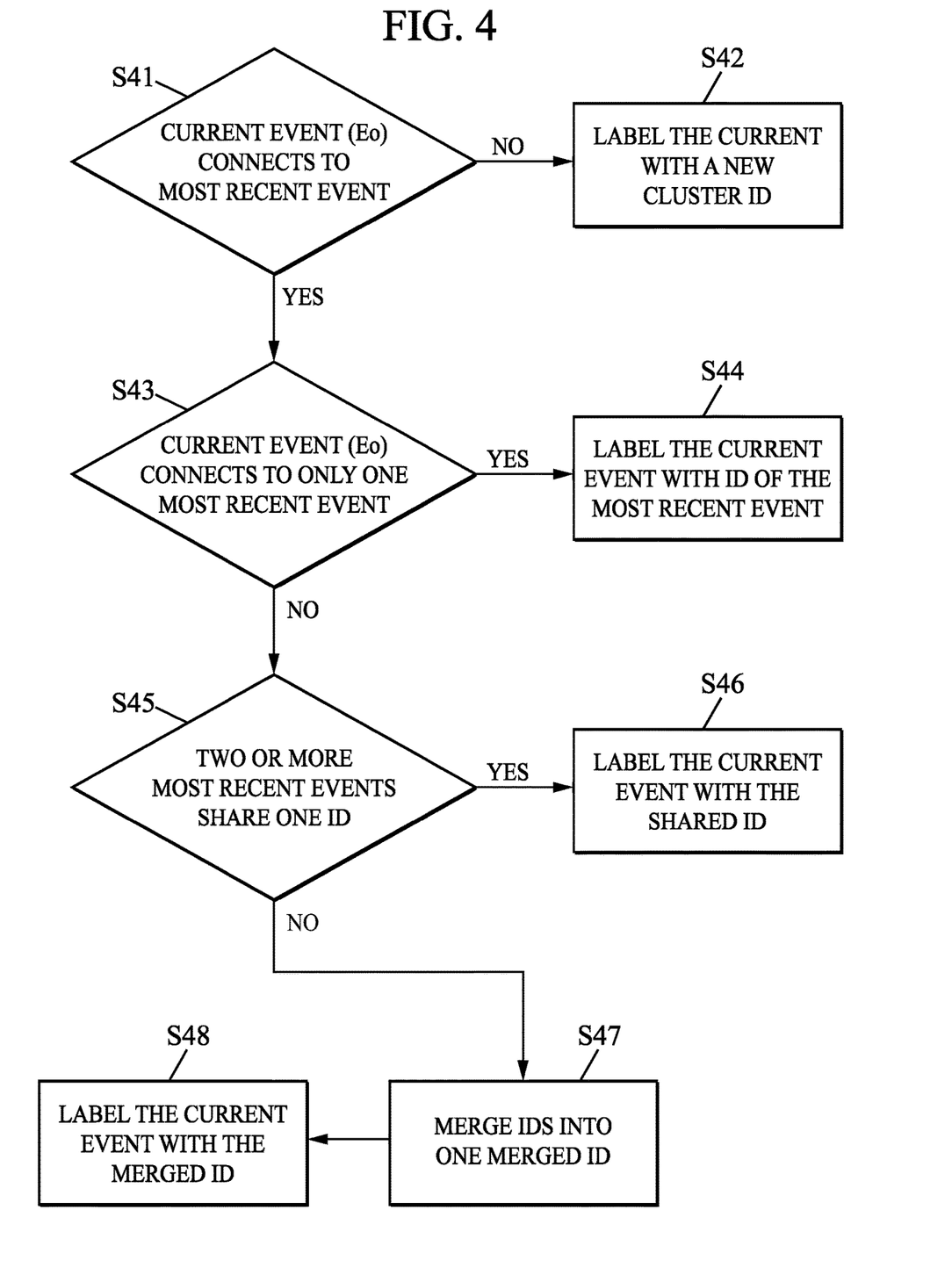
FIG. 4 is a flowchart of an illustrative embodiment of step labeling the current event.

Moreover, by way of example, in step S4, the connectivity can be determined by at least one of the following criteria, where, similarly, the current event E is originated from pixel A at position ($x_i$, $y_i$) and a most recent event ev(i+1, $t_i$) is originated from a pixel positioned at ($x_i$+1, , $y_i$) in FIGS. 3a and 3b.

A connectivity criterion between the current event E with a time stamp $t_i$ and a most recent event ev(i+1, $t_2$) stored in the data structure with a time stamp $t_2$ may be applied to a difference of timestamps $t_1-t_2$ between the current event E and the most recent event ev(i+1, $t_2$). For example, when if the difference $t_1-t_2$ of timestamps is smaller than a given threshold connectivity between events E and ev(i+1, $t_i$) is determined. Its value may be set based on the application that takes advantage of the connected component analysis. Without limitation, an illustrative value of the threshold can be in a range of 0.1 ms to 20 ms. The threshold may be made adaptive based on the local event dynamics. Alternatively, if the difference $t_1-t_2$ of timestamps falls into a range, the connectivity can also be determined.

When the event data included in the data structure for a pixel include the polarity p of the most recent event originating from that pixel, a connectivity criterion between the current event E and a most recent event ev(i+1, $t_i$) on the data structure may involve the polarity of the current event and that of the most recent event ev(i+1, $t_i$). For example, if the polarity is the same, connectivity between the events E and ev(i+1, $t_i$) is determined.

When the event data included in the data structure for a pixel include the flickering frequency estimated for the most recent event from that pixel, a connectivity criterion between the current event E and a most recent event ev(i+1, ti) on the data structure may involve the flickering frequencies estimated for the current event E and for the most recent event ev(i+1, ti). For example, if the flickering frequencies are the same or within a predetermined margin, connectivity between the events E and ev(i+1, ti) is determined.

When the event data included in the data structure for a pixel include visual flow data estimated for the most recent event originating from that pixel, a connectivity criterion between the current event E and a most recent event ev(i+1, $t_i$) may involve the visual flow data estimated for the current event E and for the most recent ev(i+1, $t_i$). For example, if the orientation and/or the magnitude of the flow is the same or within a predetermined margin, connectivity between the events E and ev(i+1, $t_i$) is determined.

When the event data included in the data structure for a pixel include a depth or stereo disparity value estimated for the most recent event originating from that pixel, a connectivity criterion between the current event E and a most recent event ev(i+1, $t_i$) may include involve the depth or stereo disparity values estimated for the current event E and for the most recent event ev(i+1, $t_i$). For example, if the depth or the disparity is the same or within a predetermined margin, connectivity between the events E and ev(i+1, $t_i$) is determined.

After being labelled in step S4, the current event E can, for example, be grouped with other events, for example, having the same ID, as shown in step S5, so as to form a cluster including events with the same ID. Alternatively, the grouping can also be based on different IDs according to certain criteria, such as different IDs ranked in numerical order. Afterwards, the state of the cluster can be stored in a list of clusters which can have different implementation more or less efficient, such as a hash table or a vector with an indirection table.

Afterwards, in step S6, the cluster having for example spatio-temporal coherency could be extracted to obtain features corresponding to objects in the scene, for example, a vehicle in a traffic road, or even small contourlets in the scene. These features include but not limit to edges, interest points, regions of interest points, or ridges of the object. With these features, the cluster, for example corresponding to those contourlets, can be defined by stable geometrical constraints enabling for stable and precise observation and tracking. An exemplary embodiment of detecting and tracking visual object after forming clusters is descripted in US 2016/0086334 A1, for example, in steps of updating information associated with the cluster and calculating the size and orientation of the object as a function of the updated information.

Furthermore, after grouping clusters and extracting features from the clusters, it is possible to track or predict the position and speed of the cluster with an estimator, such as an event-based blob tracker or be a more standard one like a Luenberger or a Kalman estimator. For example, in a scene where an event-based sensor is observing a vehicle that is moving passed an obstacle, such as a tree, during which at least a part of the vehicle cannot be observed by the sensor due to the obstacle. By means of estimator, the vehicle can be continuously tracked in a more effective manner.

Information from other sources can also be used in the cluster from previously received events like depth from stereo to augment the cluster state with the depth of the event for instance, enabling more states to be obtained and tracked, like the 3D position of the center of the cluster. An exemplary embodiment of 3D reconstruction is discussed in WO2016/146938.

Some other implementations could be derived depending on the exact use of the connected components features extracted by means of the method according to the present invention, for example, for extracting and tracking traffic lights.

Advantageously, the method according to the present invention uses only very local data, because it assumes that a contour will move through every pixel while being sampled by the sensor and thus has relatively low memory bandwidth requirements. The same property could also enable high parallelization on some specific architectures. Therefore, the implementation is relatively simple. Only a limited memory of the size of the pixel array need to be used to store the data structure, which contains the information necessary for the connectivity determination under several criterions as mentioned above. In this regard, the method according to the present invention can be implemented on a laptop, a mobile device or other device with relatively low processing power, or in a processor associated with the event-based sensor in a common device.

The above-described method may be implemented using program instructions recorded in non-transitory computer-readable media to implement various operations which may be performed by a computer. The media may also include, alone or in combination with the program instructions, data files, data structures, and the like. The program instructions recorded on the media may be those specially designed and constructed for the purposes of the illustrative embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one.

In an example of application, the apparatus including the event-based sensor 10 and the processor(s) 12 is used in an automobile to detect and track objects on the roads, such as traffic light, moving objects, etc., so as to provide these dynamic information to autonomous driving system.

More generally, the present invention may be useful in a variety of devices including, without limitation, autonomous vehicles, prosthetic devices, autonomous and robotic apparatus such as manufacturing robots, military or medical robotic devices.

Implementations of the invention may be used in many applications including computer human interaction (e.g., recognition of gestures, voice, posture, face, and/or other applications), controlling processes (e.g., an industrial robot, autonomous and other vehicles), following movements of a set of interest points or objects (e.g., vehicles or humans) in the visual scene and with respect to the image plane, augmented reality applications, virtual reality applications, access control (e.g., opening a door based on a gesture, opening an access way based on detection of an authorized person), detecting events (e.g., for visual surveillance or people or animal), counting, tracking, etc. Myriads of other applications exist that will be recognized by those of ordinary skilled in the art given the present disclosure.

The embodiments described hereinabove are illustrations of this invention. Various modifications can be made to them without leaving the scope of the invention which stems from the annexed claims.

The invention claimed is:

1. A method of processing information from an event-based sensor, the event-based sensor having an array of pixels facing a scene, the method comprising:
   storing a data structure for a set of pixels of the array, the data structure including, for each pixel of the set, a polarity of the most recent event originating from the pixel and a timestamp of the most recent event originating from the pixel; and
   upon receiving a current event from a current pixel of the array:
   retrieving polarities and timestamps included in the data structure for a group of pixels including the current pixel and a plurality of pixels adjacent to the current pixel in the array, wherein the retrieved polarities for the group have different signs; and
   labeling the current event based on a connectivity criterion between the current event and the most recent event originating from the group,
   wherein the connectivity criterion is true when both of the following conditions are met:
   the polarity of the current event and the polarity of said most recent event originating from the group are equal; and
   a difference of timestamps between the current event and said most recent event originating from the group is below a threshold.

2. The method of claim 1, wherein labeling the current event comprises, if the current event does not fulfil the connectivity criterion with any event being a most recent event originating from a pixel of the group:
   allocating a new cluster ID to the current event; and
   including the allocated new cluster ID in the data structure for the current pixel.

3. The method of claim 1, wherein labeling the current event comprises, if the current event fulfils the connectivity criterion with only one event being a most recent event originating from a pixel of the group:
   allocating to the current event a cluster ID previously allocated to said one event; and
   including the allocated cluster ID in the data structure for the current pixel.

4. The method of claim 1, wherein labeling the current event comprises, if the current event fulfils the connectivity criterion with a plurality of events that are most recent events originating from respective pixels of the group while a same cluster ID is allocated to said plurality of events:
   allocating the same cluster ID to the current event; and
   including the same allocated cluster ID in the data structure for the current pixel.

5. The method of claim 1, wherein labeling the current event comprises, if the current event fulfils the connectivity criterion with a plurality of events that are most recent events originating from respective pixels of the group while different cluster IDs are allocated to said plurality of events:
   merging the different cluster IDs into a merged cluster ID;
   allocating the merged cluster ID to the current event; and
   including the allocated merged cluster ID in the data structure for the current pixel.

6. The method of claim 1, wherein the plurality of adjacent pixels of the group include 4 or 8 pixels directly surrounding the current pixel in the array of pixels.

7. The method of claim 1, further comprising grouping events labelled with a same cluster ID so as to form a cluster, and extracting features from the cluster.

8. The method of claim 7, further comprising tracking the cluster based on the extracted features by means of an estimator which estimates a position of a center of the cluster and a speed of the cluster.

9. The method of claim 7, wherein the extracted features comprise edges, interest points, regions of interest points, or ridges.

10. The method of claim 8, wherein the extracted features comprise edges, interest points, regions of interest points, or ridges.

11. The method of claim 1, wherein the connectivity criterion is true only when at least one other of the following criteria based on information stored in the data structure is true:
 a flickering frequency estimated for the current event and an estimated flickering frequency for said most recent event originating from the group are within a margin;
 estimated visual flow data for the current event and estimated visual flow data for said most recent event originating from the group have a magnitude or orientation within a margin; and
 an estimated depth or stereo disparity value for the current event and an estimated depth or stereo disparity value for said most recent event originating from the group are within a margin.

12. A non-transitory computer-readable medium having computer code stored thereon for execution in a processor coupled with an event-based sensor, the computer code being adapted, when executed by the processor, to process information from an event-based sensor, the event-based sensor having an array of pixels facing a scene, wherein processing the information comprises:
 storing a data structure for a set of pixels of the array, the data structure including, for each pixel of the set, a polarity of the most recent event originating from the pixel and a timestamp of the most recent event originating from the pixel; and
 upon receiving a current event from a current pixel of the array;
 retrieving polarities and timestamps included in the data structure for a group of pixels including the current pixel and a plurality of pixels adjacent to the current pixel in the array wherein the retrieved polarities for the group have different signs; and
 labeling the current event based on a connectivity criterion between the current event and the most recent event originating from the group,
 wherein the connectivity criterion is true when the following conditions are met:
 the polarity of the current event and the polarity of said most recent event originating from the group are equal; and
 a difference of timestamps between the current event and said most recent event originating from the group is below a threshold.

* * * * *